Figure 1:
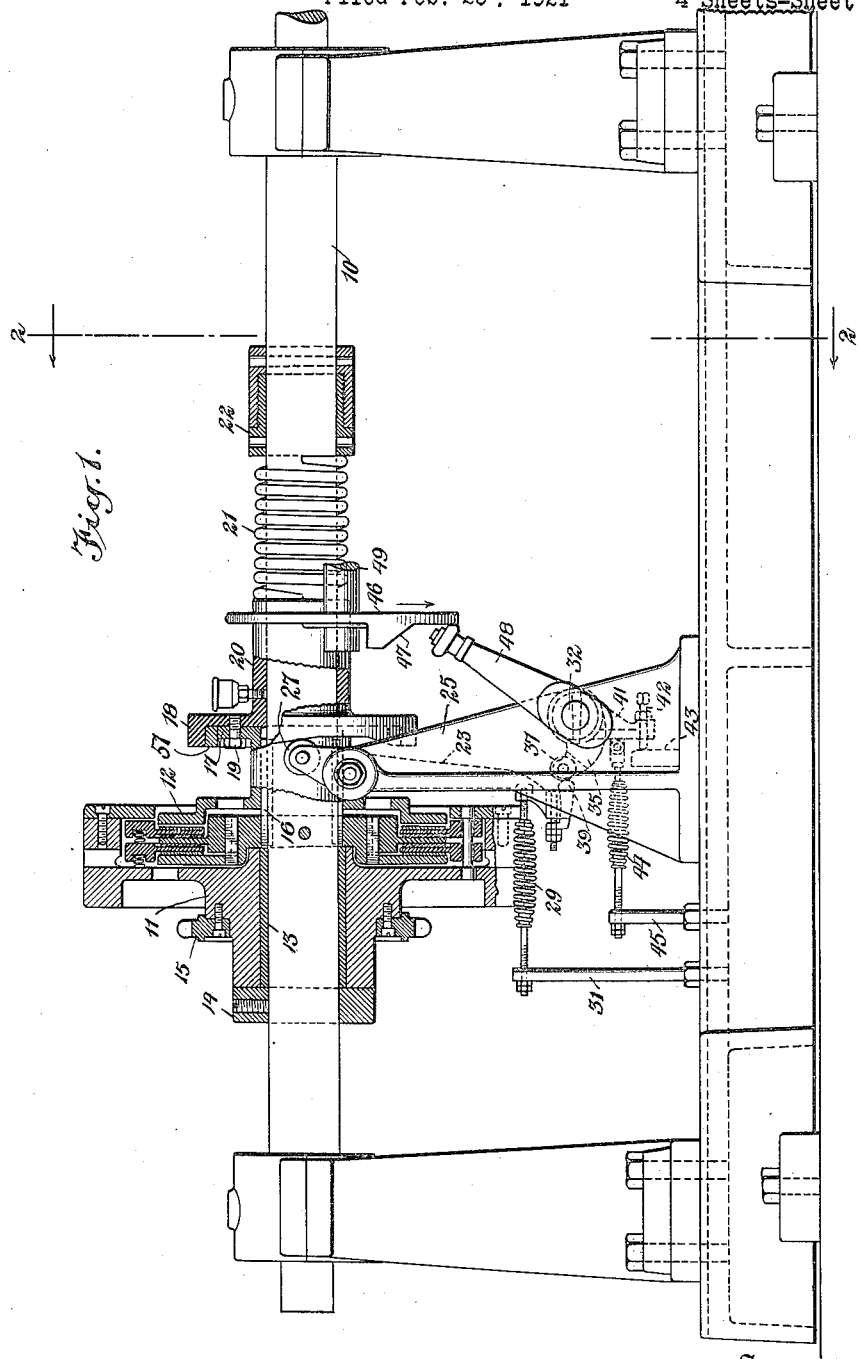

Oct. 30, 1923.

B. M. FINE 1,472,411

CLUTCH OPERATING MECHANISM

Filed Feb. 25, 1921   4 Sheets-Sheet 1

Inventor
Bernard M. Fine
By his Attorney

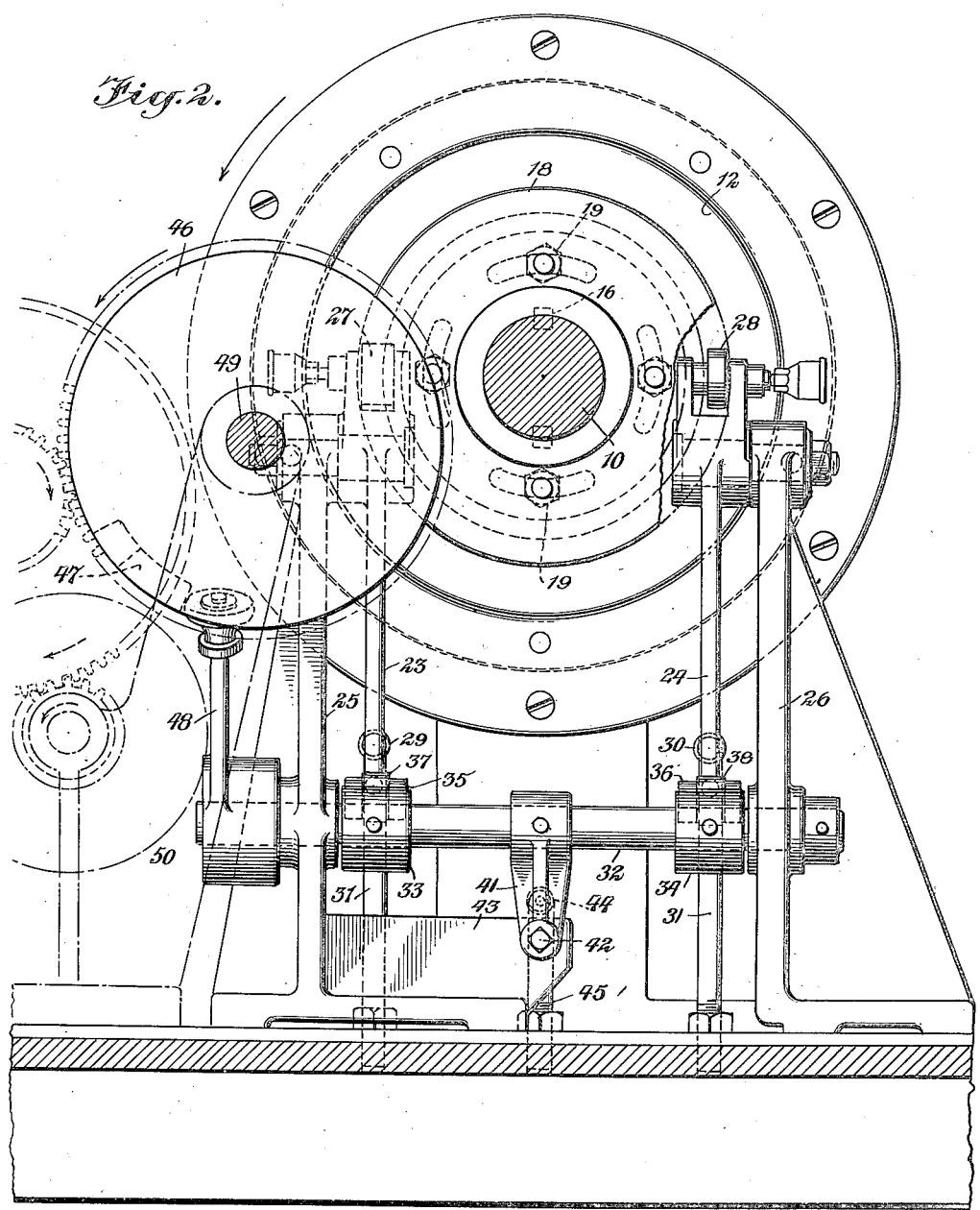

Oct. 30, 1923.
B. M. FINE
1,472,411
CLUTCH OPERATING MECHANISM
Filed Feb. 25, 1921      4 Sheets-Sheet 3
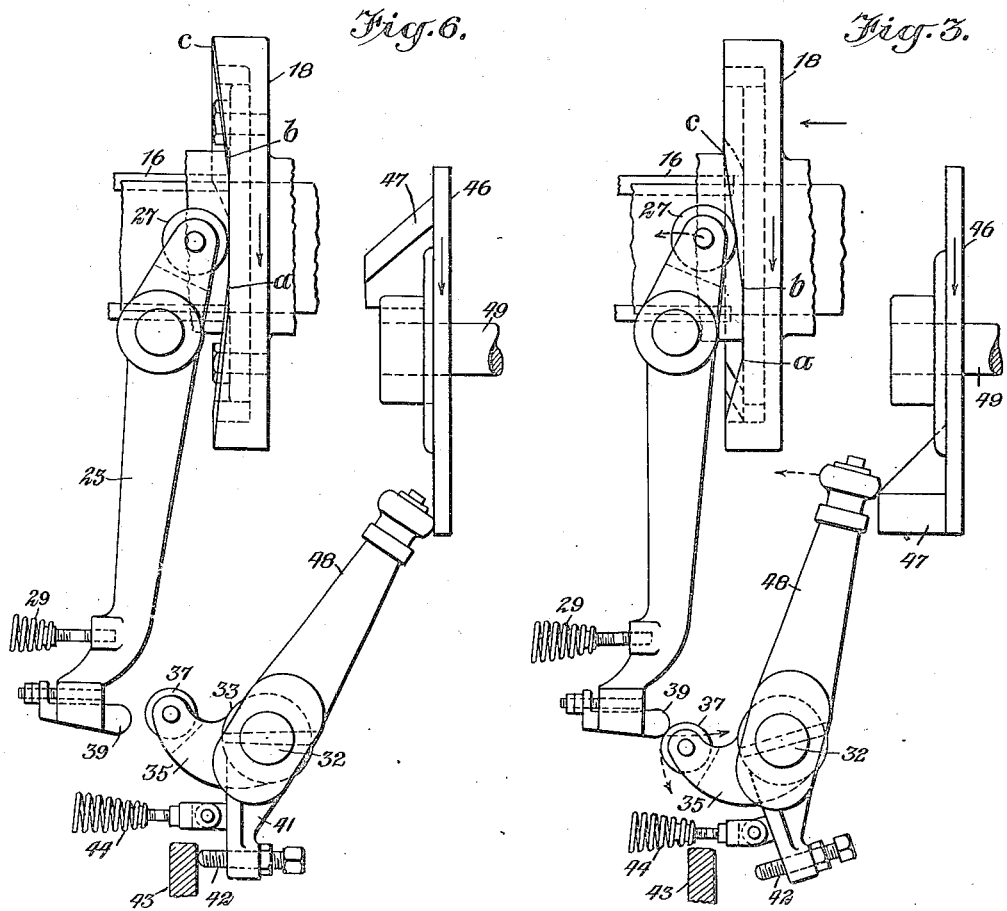
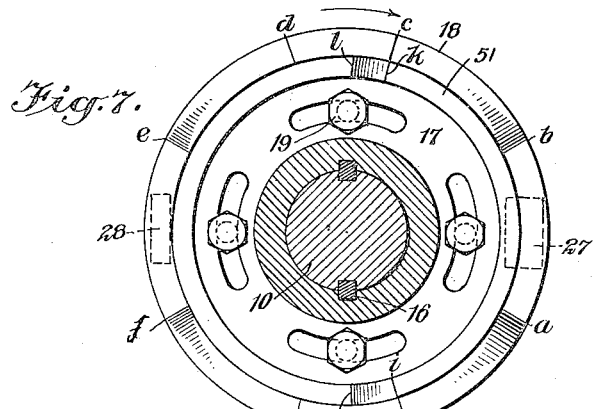
Inventor
Bernard M Fine
By his Attorney
C W Fairbank Oct. 30, 1923.
B. M. FINE
1,472,411
CLUTCH OPERATING MECHANISM
Filed Feb. 25, 1921
4 Sheets-Sheet 4
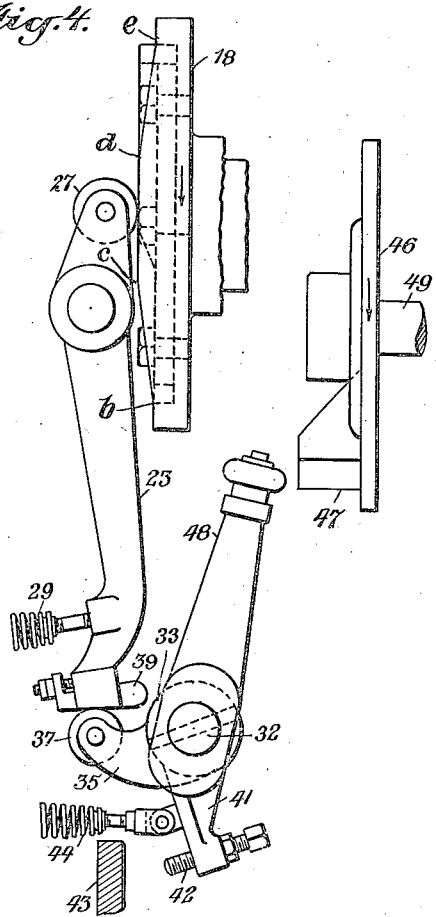
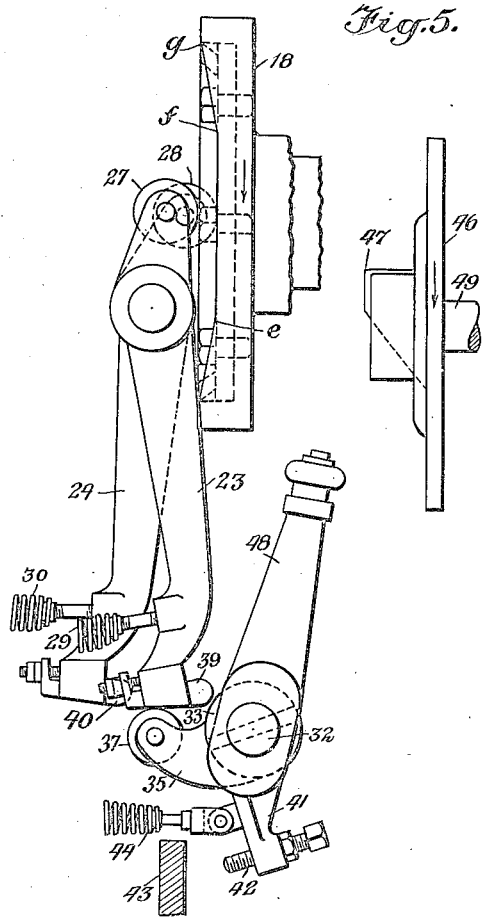
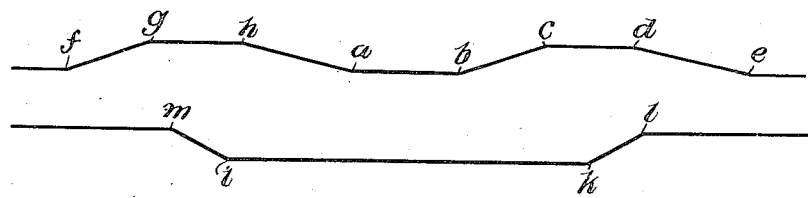
Inventor
Bernard M Fine
By his Attorney Patented Oct. 30, 1923.

1,472,411

UNITED STATES PATENT OFFICE.

BERNARD M. FINE, OF DEPTFORD TOWNSHIP, GLOUCESTER COUNTY, NEW JERSEY, ASSIGNOR TO SAMUEL M. LANGSTON COMPANY, OF CAMDEN, NEW JERSEY, A CORPORATION OF NEW JERSEY.

CLUTCH-OPERATING MECHANISM.

Application filed February 25, 1921. Serial No. 447,651.

*To all whom it may concern:*

Be it known that I, BERNARD M. FINE, a citizen of the United States, and resident of Deptford Township, in the county of Gloucester and State of New Jersey, have invented certain new and useful Improvements in Clutch-Operating Mechanisms, of which the following is a specification.

My invention is an operating or controlling mechanism for effecting or permitting a desired movement or cycle of movements of a part or a series of parts, automatically and intermittently. I have designed and illustrated an embodiment of my invention particularly adapted for normally holding a clutch member in disengaged position, but effecting or permitting the engagement of the clutch member with its companion and then the disengagement thereof, giving a single revolution of the normally stationary clutch member. Other embodiments of my invention might be designed and used in connection with other devices where separate successive rotary movements of a part at time intervals is desired. The form shown is designed for use in connection with the cut-off mechanism shown in Patent 1,359,076 of Samuel M. Langston. In that construction the crank shaft is at rest while the sheet material is being fed to the desired distance between the shear blades. The clutch is then engaged to make one revolution of the crank shaft, cutting off the material and returning the parts to normal or rest position. This is only one of many machines or apparatus with which the specific form of mechanism here illustrated may be used.

Among the objects and advantages of my invention are the following. It permits the intermittently driven parts to coast slightly under their own momentum during or immediately following the clutch disengaging movement so as to facilitate absorbing the shock of stopping. The clutch is disengaged by the action of cams carried by the intermittently rotated clutch member, so that the power for disengaging the clutch is transmitted through the clutch itself. The force required in effecting the disengaging movement of the clutch is taken from the intermittently rotated member, so that this force acts as a brake on said member to aid in bringing it to rest after disengagement. The disengaging cam is adjustable in respect to the connected clutch member, so that the point of starting the disengaging movement may be altered and may take place sooner or later in the cycle, depending on the speed of the machine and the momentum to be overcome in stopping the intermittently driven parts, or the time of the coasting operation. The force required to disengage the clutch is applied at diametrically opposite points in respect to, and at equal distances from, the axis of rotation, so that there is no tendency of the clutch member to tilt in respect to the axis during the axial movement against the heavy operating spring. The trip is so constructed as to present a pair of stops acting as abutments for a pair of levers connecting with similar inclined surfaces at diametrically opposite points on the cam, and in connection with these parts, a further cam surface, after a half revolution, cooperates with one of said levers to prevent said stops from returning to position at that time, and therefore the driven clutch member is given a single but complete revolution. The parts are rugged in construction and simple in design, so as to be free from liability of injury from rough usage. Other objects and advantages will be apparent from a study of the invention by those skilled in the art.

In the form illustrated in the accompanying drawings:

Figure 1 is a side elevation, some of the parts being broken away, and many being illustrated in a central longitudinal section, the clutch being in normally disengaged position.

Figure 2 is a transverse section on the line 2—2 of Figure 1, certain parts being broken away, Figures 3, 4, 5 and 6 are details showing the operation of the clutch operating mechanism and the trip therefor, Figure 3 showing the position occupied at the instant of releasing the clutch members and permitting their engagement, Figure 4, the next successive position with the clutch engaged, Figure 5 the position after approximately a half revolution of the driven clutch member, and Figure 6 the position just prior to disengagement.

Figure 7 is a face view of the cams, and Figure 8 is a development of the cams.

I have illustrated my invention in connection with a shaft 10 to be intermittently rotated and it may be the shaft 22 of the cut-off mechanism shown in the Langston patent above referred to. Mounted on this shaft is a clutch including clutch members 11 and 12, relatively movable axially, and one keyed on the shaft and the other rotatable in respect thereto. I do not claim any improvement in the specific details of the clutch mechanism illustrated, as this may be varied within wide limits so far as the scope of my invention is concerned. I have shown a type of multiple disc clutch, but any other form of clutch may be substituted, depending upon the character of the machine with which my improved construction is employed, for instance the clutch might be of the ordinary cone type or might be a positive type of clutch with interengageable teeth. As shown, the clutch member 11 is freely rotatable on the shaft 10, there being provided an anti-friction bearing surface 13 and a stop collar 14 to prevent endwise movement of the clutch member. This clutch member 11 is continuously rotated from an outside source of power in any suitable manner. As illustrated it has a sprocket wheel 15 rigidly secured thereto for receiving a driving chain, and the main body of the clutch member is made of a heavy, rigid construction, so as to serve in effect as a fly wheel and to thus aid in overcoming the inertia of the driven parts when the clutch is engaged. The clutch member 12 is free to move a limited distance longitudinally of the shaft, but is held against rotation in respect to the shaft by any suitable means, such, for instance, as a key 16.

The clutch member 12 has a peripheral flange 17 to which is rigidly secured a cam member 18, the connections being such as to permit relative rotary adjustment. Preferably the flange 17 is slotted, as indicated in Figure 7, and the securing bolts 19 extend through these slots. The cam member 18 has a bearing sleeve 20, serving as one abutment for a heavy coil spring 21 encircling the shaft, the other end of the spring abutting against a collar 22 secured to the shaft but endwise adjustable in respect thereto. The coil spring thus acts through the sleeve 20 to normally press the clutch member 12 endwise with sufficient force to effect the proper engagement of the clutch when the members engaging with the cam permit such axial movement.

For facing the clutch member to disengaged position against the action of the spring 21, and for holding it in such disengaged position for the desired time interval, I provide a pair of levers 23 and 24 pivotally mounted adjacent to their upper ends on brackets 25 and 26. The two levers carry rollers 27 and 28 for engagement with the cam member 18 at diametrically opposite points in respect to the axis of the shaft 10. The cam member faces axially and the pivotal supports of the levers 23 and 24 are in alignment with each other and permit the bodily movement of the rollers 27 and 28 in a direction substantially parallel to the axis of the shaft. The cam 18 includes two similar cam sections, the parts of each cam section corresponding with those diametrically opposite on the other cam section.

Referring to Figures 7 and 8, the cam member 18 has a low from $a$ to $b$, and a high from $c$ to $d$; a second low from $e$ to $f$, and a second high from $g$ to $h$. Thus the cam section $b-c-d-e$ correspond to the cam section $f-g-h-a$; upward incline $b-c$ corresponds to the upward incline $f-g$, and the downward incline $d-e$ corresponds to the downward incline $h-a$. The rollers 27 and 28 and the levers 23—24 are caused to follow the surface of the cam member 18 (except as hereinafter pointed out). For this purpose there is illustrated a pair of coil springs 29 and 30 connected to the levers, adjacent their lower ends and connected to stationary posts or abutments 31. The springs illustrated are tension springs pulling the lower ends of the levers toward the left and the upper ends toward the right from the position shown in Figure 1 to hold the rollers against the cam member which faces toward the left hand in this figure.

As a combined stop and trip for these levers I provide a transverse shaft 32 to which is rigidly secured a pair of collars 33—34. These collars carry arms 35—36 on which are mounted rollers 37 and 38 in the path of movement of the lower ends of the levers 23—24. The levers at their lower ends carry curved contact surfaces 39—40 which are preferably removable and replaceable in case of excessive wear, and which are also preferably adjustable in a direction substantially at right angles to the general length of the levers, so as to vary the extent of the disengaging movement of the clutch and to permit the clutch member 12 to move further when the friction plates become worn.

The shaft 32 is free to oscillate through a limited arc, so as to bring the common axes of the two rollers 37 and 38 above or below the end of the contact surfaces 39—40 on the levers 23—24. For limiting the upward movement of the rollers the shaft carries an arm 41 rigidly secured thereto, and this arm has an adjustable set-screw 42 serving as a stop for engagement with a stationary frame member 43. A coil spring 44 is secured to the arm 41, and normally tends to oscillate the shaft to the limiting position indicated in Figures 1 and 6. This is also a tensile spring, and has its opposite end adjustable in respect to a bracket arm 45.

Various different means might be employed for intermittently oscillating the shaft 32 against the action of the spring 44 to effect the engagement of the clutch as hereinafter pointed out. Merely as an example of such an operating mechanism I have shown a rotary disc 46 presenting a cam lug 47 which may engage with the free end of a lever 48 secured to the shaft 32. This disc is shown as mounted on a shaft 49 and may be rotated continuously at slow speed and at any desired speed in respect to the speed of rotation of the clutch member 11. In Figure 2 I have illustrated, somewhat diagrammatically, a bracket 50 for supporting the shaft 49 of this disc, and shown the disc driven by a speed reducing gear merely to indicate the comparatively slow speed of rotation of the disc 46 and trip cam 47 in respect to the speed of rotation of the shaft 10.

The mechanism above described will operate as hereinafter pointed out, to intermittently permit the engagement of the clutch parts, but will disengage them to give only a half revolution, due to the similar and opposite cam faces acting on the oppositely disposed rollers 27 and 28. To prevent such operation and to insure a complete rotation of the clutch driven parts, I provide an auxiliary cam member 51 which may be rigidly secured to the cam member 18 and have its operating face presented axially just inside of the operating face of the cam member 18. This cam member 51 has a low section $i$—$k$ and a high section $l$—$m$, there being inclined surfaces $k$—$l$ and $m$—$i$ therebetween.

From Figure 7 it will be noted that the high $l$—$m$ of the inner cam extends from one high, $c$—$d$ of the outer cam around to the other high, $g$—$h$ of the outer cam, so as to extend all the way across the low $e$—$f$ of the outer cam. It will also be noted that the low $i$—$k$ of the inner cam is adjacent to the low $a$—$b$ of the outer cam. One of the rollers, for instance the roller 27, is made of such width and is so positioned that it may engage with the inner cam 51 but the roller 28 is narrower, and can engage only with the outer cam 18. With the parts in the position indicated in Figure 6 and by dotted lines in Figure 7, the roller 28 is on the low $e$—$f$ of the outer cam, and the roller 27 is on the low $a$—$b$ of the outer cam and the low $i$—$k$ of the inner cam. Thus the lower ends of the two levers 23—24 are pulled endwise beyond and out of engagement with the rollers 37 and 38. With the parts in this position the clutch is in engagement, and the clutch member 12 and the cams 18 and 51 are being positively rotated in the direction indicated by the arrow. The instant that the roller 27 begins to go up the incline $b$—$c$ and the roller 28 up the incline $f$—$g$, the lower ends of the levers 23—24 swing to the right a very slight distance to engage with the rollers 37—38, slightly below the axis of the latter. As the rollers 37—38 cannot move upwardly or out of the path of the contact surfaces 39—40, by reason of the stop 42, further movement of the levers 23—24 is prevented. The further rotation of the cams and the driven clutch member therefore results in an axial movement of the cams 18 and 51 and the clutch member 12 toward and to disengaged position. The disengagement of the clutch may take place before the rollers reach the upper ends of the cam inclines, or may not take place until the rollers reach the highs of the cams, but this is merely a matter of adjustment. As soon as the clutch is disengaged there is no longer any transmission of power to the driven clutch member 12 and the cams, and the shaft is brought to rest preferably by means of some brake mechanism not illustrated although the pressure of the rollers 27—28 on the cam 18 tends to stop the shaft, particularly if the clutch disengagement takes place somewhat before the rollers reach the upper ends of the highs of the cams. The driven parts may be permitted to coast for a limited distance with the rollers on the highs $c$—$d$ and $g$—$h$, the extent of the coasting movement being dependent upon the speed of the machine, the momentum of the parts and the character of the brake employed. The position of the parts at the beginning of or during the clutch disengagement is indicated in Figure 1.

The parts remain at rest for the desired interval with the lower ends of the levers 23, 24 engaging below the centers of the rollers 37—38 and the clutch being held open against the spring 21 by the action of the rollers 27—28 on the cam 18. The disc 46 with the trip cam 47, is so geared as to speed ratio that when the shaft 10 has remained at rest for the desired time interval, the trip cam 47 engages with the upper end of the lever 48, as shown in Figure 3, and tilts the shaft 32 until the centers of the rollers 37—38 are below the ends of the levers 23—24. This position is indicated in Figure 3. The strong pressure of the spring 21 then forces the clutch parts together and causes the lower ends of the levers 23—24 to ride over the rollers 37—38 and against the action of the springs 29 and 30, and to the position shown in Figure 4. As the roller 28 starts to go down the incline $h$—$a$ toward the low $a$—$b$, the lower end of the lever 24 is pulled back by the spring 30 to the position indicated in Figure 5, and were it not for the other lever 23, the trip lever 48 would swing back to the position shown in Figure 6; but it will be noted that when the roller 28 reaches the low $a$—$b$, the wider roller 27 is prevented from entering the low $e$—$f$, due to its engagement with the high $l$—$m$ of the inner cam. Thus the lever 23 is held in the position shown in Figure 5, and the trip lever 48 cannot return to the position shown in Figure 6. The lever 23 holds this position while its wide roller 27 travels along the high $c$—$d$ of the outer cam, the high $l$—$m$ of the inner cam and the high $g$—$h$ of the outer cam to the beginning of the incline $h$—$a$ on the outer cam. The trip lever 48 is thus held in inoperative position during more than a half revolution, namely from $c$ around the left hand side to $h$ on Figure 7. When the wide roller coasts down the incline $h$—$a$, the narrow roller goes down the incline $d$—$e$, and when both rollers strike their low point the parts have returned to the position shown in Figure 6, and the spring 44 pulls the trip lever over till the rollers 37 and 38 are above the lower ends of the levers 23—24. It will be noted that the clutch has been engaged from the time the trip lever 48 was swung over, as shown in Figure 3, until the parts passed through the positions shown in Figures 4, 5 and 6. Further positive rotation of the driven clutch member and the cams causes the cam 18 and clutch member to be forced axially by the cam engagement with the rollers 27 and 28 and the clutch is again disengaged. It will be noted that the pressure of disengaging the clutch is applied to the cam member 18, and at points diametrically opposite in respect to the axis of the shaft 10, and at equal distances from the axis. The cam 51 does not partake in this forcing movement, but serves only to hold the lever 23 in locking position above the trip lever and prevent the return of the latter until the half revolution has been completed, so that the complete revolution can be made and the parts then stopped. The cam member 51 may be removed if only a half revolution of the shaft is desired. It will be noted that the roller 28 does not engage with cam 51 and that the only part of the cam 51 which roller 27 need engage is the high part $l$—$m$. Therefore, the cam 51 in effect, serves only as a bridge piece from one high $c$—$d$ to the other high $g$—$h$ of the cam 18. Other forms of bridge pieces might be employed and the parts of the cam 51 shown at the right hand side of Fig. 7 from $m$ through the low $i$—$k$ to $l$ might be entirely omitted.

The rollers 27 and 28 serve as abutments for the cam 18 to act against when the lower ends of the levers are locked by the trip mechanism as shown in Fig. 1 and the lowering of the trip mechanism permits these abutments to move with the cams and clutch under the action of spring 21. For some purposes other forms of abutments axially movable when released might be employed.

From the foregoing it will be seen that the fly wheel 11 rotates constantly, but that the clutch is normally disengaged so that the shaft 10 is at rest. The shaft 49 and cam disk 46 rotate constantly or intermittently at will, but each time the cam 47 engages the lever 48 to swing it, the main clutch is engaged to rotate the shaft one complete revolution, and is then disengaged. The primary control for engaging the clutch is therefore cam 47, but the disengagement is automatic.

Having thus described my invention, what I claim as new and desire to secure by Letters Patent is:

1. In combination a driven clutch member axially movable into and out of power receiving position, an axially facing cam connected to said member and a pair of independently movable abutments engaging with said cam at diametrically opposite points to force said clutch member to freed position by the action of the cam against said abutments when said member and cam reach a predetermined point in rotation and said abutments being movable axially in respect to said clutch, to permit the movement of said clutch member to power receiving position.

2. In combination a driven clutch member, axially movable into and out of power receiving position, a cam connected to said member, a pair of independently movable levers having parts engaging with said cam at diametrically opposite points and serving as abutments against which the cam may act to move the clutch to freed position, and trip mechanism adapted to engage with both of said levers for preventing the swinging of the latter, and effecting the axial movement of the driven clutch member.

3. In combination a driven clutch member axially movable into and out of power receiving position, a cam connected to said member, a lever mechanism having parts independently movable axially of the clutch member and engaging with said cam at diametrically opposite points and serving as abutments against which the cam may act to move the clutch to freed position, and trip mechanism coacting with said lever mechanism to prevent the swinging of the latter and effecting the axial movement of said clutch member by the action of the cam on the lever mechanism.

4. In combination a cam having a pair of similar, oppositely disposed axially facing sections with spaces between, a pair of abutments engaging with said cam at diametrically opposite points for forcing said cam axially by engagement with said abutments, trip mechanism for releasing said abutments and permitting their axial movement with the cam, and means for preventing one of said abutments from entering one of the spaces between said cam sections and permitting the other abutment to enter both of said spaces between cam sections.

5. In combination a cam having a pair of similar, oppositely disposed axially facing sections with spaces between, a pair of abutments engaging with said sections at diametrically opposite points to effect the axial movement of the cam by its action against said abutments, one of said abutments extending radially of said cam to a greater distance than the other, trip mechanism for releasing said abutments and permitting axial movement with the cam, and a bridge-piece preventing said first mentioned abutments from entering one of the spaces between the cam sections.

6. In combination a driven clutch member, a spring normally tending to hold said member in power receiving position, a cam connected to said member and having a pair of similar, oppositely disposed axially facing sections, a pair of levers having abutments engaging with similar cam surfaces at diametrically opposite points, trip mechanism movable into or out of the path of said levers for preventing or permitting axial movement of the abutments with the cam, one of said levers serving to prevent the return of said trip mechanism to locking position after being tripped, and until after rotation of said cam through more than a half revolution.

7. In combination a driven clutch member, a spring normally tending to hold said member in power receiving position, a cam connected to said member and having a pair of similar, oppositely disposed axially facing sections a pair of levers having abutments engaging with similar cam surfaces at diametrically opposite points, trip mechanism movable into or out of the path of said levers for preventing or permitting axial movement of the abutments with the cam, and a bridge-piece for preventing one of said abutments from entering the space between said cam sections, and thereby preventing the return of said trip mechanism to locking position after being tripped and until after rotation of said cam through more than a half revolution.

8. In combination a driven clutch member, a spring normally tending to hold said member in power receiving position, a cam connected to said member and having a pair of similar, oppositely disposed sections, a pair of levers having rollers engaging with said cam, one of said rollers being of greater width than the other, a bridge-piece connected to said cam and preventing the wider roller from entering one of the spaces between said cam sections, and a pair of connected trip members in the path of movement of said levers.

9. In combination a driven clutch member axially movable into and out of power receiving position, an axially facing cam connected to said member, a pair of abutments acting on said cam at diametrically opposite points and at equal radial distances from the axis of the cam, and means for preventing axial movement of said abutments to thereby effect axial movement of the cam during the rotation of the cam through a predetermined angular arc and permitting said axial movement during the rotation of the cam through the diametrically opposite angular arc.

10. In combination a driven clutch member axially movable into and out of power receiving position, an axially facing cam connected to said member, a pair of abutments acting on said cam at diametrically opposite points and at equal radial distances from the axis of the cam, and means for locking the abutments against axial movement during the movement of a portion of the cam in juxtaposed relationship to one abutment and permitting axial movement of the abutments during movement of said cam portion in juxtaposed relationship to the other abutment.

11. In combination a cam having a pair of similar oppositely disposed axially facing cam sections with spaces therebetween, a pair of abutments for engaging said sections at diametrically opposite points to permit or prevent axial movement of the cam by its action against said abutments, and means for locking said abutments against axial movement during the engagement of one cam section with one abutment, and permitting axial movement of the abutments during movement of said last mentioned cam section past the other abutment.

12. In combination a cam having a pair of similar oppositely disposed axially facing sections at equal radial distances from the axis of the cam and spaced apart circumferentially of the cam, a pair of abutments for engaging with said cam sections at diametrically opposite points to effect the axial movement of the cam by its action against said abutments, and means for locking said abutments against axial movement while the cam is in a single predetermined comparatively short angular portion of its complete revolution.

13. In combination a cam having a pair of similar oppositely disposed axially facing sections at equal radial distances from the axis of the cam and spaced apart circumferentially of the cam, a pair of abutments for engaging with said cam sections at diametrically opposite points to effect the axial movement of the cam by its action against said abutments, and means for locking said abutments against axial movement when the cam is at only one predetermined point in its complete revolution.

14. In combination a cam having a pair of oppositely disposed axially facing cam sections, a pair of independently movable pivoted levers upon opposite sides of the cam axis for simultaneous engagement with the two cam sections, and a trip mechanism including a rock shaft and a pair of stops carried thereby and movable simultaneously into or out of the path of movement of said levers.

15. In combination a cam having a pair of oppositely disposed axially facing cam sections, a pair of independently movable abutments engaging with said sections at diametrically opposite points to effect the axial movement of the cam by its action against said abutments, and a pair of rigidly connected stops movable into or out of the path of movement of the abutments.

Signed at Camden, in the county of Camden and State of New Jersey, this 31st day of January A. D. 1921.

BERNARD M. FINE.